United States Patent [19]
Baldwin et al.

[11] Patent Number: 6,053,839
[45] Date of Patent: Apr. 25, 2000

[54] MULTIPLE SPEED OVERDRIVE TRANSMISSION FOR A MOTOR VEHICLE

[75] Inventors: Reid Alan Baldwin, Howell; Peter Hodges, Livonia; Volker Poenisch, Northville, all of Mich.

[73] Assignee: Ford Global Technologies, Inc., Dearborn, Mich.

[21] Appl. No.: 09/336,310

[22] Filed: Jun. 18, 1999

[51] Int. Cl.[7] .............................. F16H 57/10; F16H 3/62
[52] U.S. Cl. .......................... 475/281; 475/283; 475/285; 475/287; 475/289
[58] Field of Search .................................. 475/280, 281, 475/282, 283, 284, 285, 286, 287, 289

[56] References Cited

U.S. PATENT DOCUMENTS

| | | | |
|---|---|---|---|
| 3,661,035 | 5/1972 | Liang ....................................... | 475/285 |
| 4,038,888 | 8/1977 | Murakami et al. .................. | 475/280 X |
| 4,056,990 | 11/1977 | Hatano ................................. | 475/285 X |
| 4,884,471 | 12/1989 | Daggett et al. ........................... | 475/285 |
| 5,234,390 | 8/1993 | Malecha ................................... | 475/281 |
| 5,800,304 | 9/1998 | Beim et al. .............................. | 475/285 |

*Primary Examiner*—Charles A Marmor
*Assistant Examiner*—Ankur Parekh
*Attorney, Agent, or Firm*—Frank G. McKenzie

[57] ABSTRACT

A multiple speed transmission for motor vehicles includes three simple planetary gearsets hydraulically actuated friction clutches and brakes for controlling operation of the gearsets and altering the torque delivery path between an input shaft and an output shaft. An overrunning brake is provided for operation in reverse drive to share the torque reaction with a friction brake. The transmission is suited to produce five, six or seven forward speed ratios and a reverse drive ratio.

9 Claims, 2 Drawing Sheets

| | 52 | 54 | 56 | 58 | 60 | 62 | 64 |
|---|---|---|---|---|---|---|---|
| Gear | CL1 | CL2 | B1 | B2 | B3 | B4 | owb |
| Reverse | | | X | | X | | |
| 1M | | X | X | | | | |
| 1 | | X | (X) | | | | X |
| 2 | | X | | | | X | O/R |
| 3 | | X | | X | (X) | | O/R |
| 4 | X | X | | | | | O/R |
| 5 | X | | | X | | | O/R |
| 6 | X | | | | X | | O/R |
| 7 | X | | | | | X | O/R |

| | 52 | 66 | 54 | 56 | 62 | 58 | 64 |
|---|---|---|---|---|---|---|---|
| Gear | CL1 | CL2 | CL3 | B1 | B2 | B3 | owb |
| Reverse | | | X | X | | X | |
| 1M | | X | X | X | | | |
| 1 | | X | X | (X) | | | X |
| 2 | | X | X | | X | | O/R |
| 3 | | X | X | | | X | O/R |
| 4 | X | X | X | | | | O/R |
| 5 | X | X | | | | X | O/R |
| 6 | X | | X | | | X | O/R |
| 7 | X | | | | X | (X) | O/R | ately driveably connects and releases a connection between ring gear 22 and sun gears 28, 36.

MULTIPLE SPEED OVERDRIVE TRANSMISSION FOR A MOTOR VEHICLE

BACKGROUND OF THE INVENTION

1. Field of the Invention

The present invention relates to the field of automatic transmissions for motor vehicles. More particularly, it pertains to a kinematic arrangement having simple planetary gearsets.

2. Description of the Prior Art

Planetary gearsets used in automatic transmissions are controlled to produce multiple gear ratios by selectively engaging and disengaging clutches, which driveably connect and release connections among gearset components, and by selectively engaging and disengaging hydraulically operated brakes, which hold gearset components against rotation, thereby providing a torsional reaction, and release them for rotation.

Generally as the number of speed ratios produced by the transmission increases, the number of clutches and brakes required to control the transmission increases. However, each open or disengaged clutch and brake reduces operating efficiency of the transmission by causing drag between friction plates of the assembly. This drag is produced by shear forces transmitted across a narrow space filled with transmission fluid between the friction plates. Drag increases as fluid viscosity increases and as fluid temperature decreases.

SUMMARY OF THE INVENTION

It is preferred that the number of open friction clutches and brakes be minimized in a transmission capable of producing a large number of forward and reverse speed ratios.

It is an object of this invention to provide a multiple speed automatic transmission having five, six or seven forward speed ratios and reverse drive, each speed spaced from adjacent speeds in appropriate steps, the transmission having minimum parasitic losses and a minimum number of open friction clutches and brakes.

It is another object to provide an overrunning brake arranged in parallel with a friction brake to realize the advantage of making the 1–2 upshift non-synchronous. It is an object to provide a transmission having multiple overdrive speed ratios in order to realize the advantage of excellent highway fuel economy.

A multiple-speed transmission according to this invention includes an input; an output; a first gearset having a first sun gear driveably connected to the input, a first ring gear, a first carrier, a first planet pinion set rotatably supported on the first carrier and driveably engaged with the first sun gear and first ring gear; a second gearset having a second sun gear, a second ring gear, a second carrier driveably connected to the first carrier, a second planet pinion set rotatably supported on the second carrier and driveably engaged with the second sun gear and second ring gear; a third gearset having a third sun gear driveably connected to the second sun gear, a third ring gear driveably connected to the output, a third carrier driveably connected to the second ring gear, a third planet pinion set rotatably supported on the third carrier and driveably engaged with the third sun gear and third ring gear; a first clutch for alternately driveably connecting and disconnecting the first sun gear and second ring gear; means for alternately driveably connecting and disconnecting the first ring gear and the second and third sun gears, and for holding against rotation and releasing the first ring gear, second sun gear and third sun gear; and a first brake for holding against rotation and releasing the third carrier and second ring gear.

The transmission is adapted to produce additional forward speed ratios by adding a second brake for holding against rotation and releasing the first and second carriers.

An overrunning brake may be included to hold the third carrier and second ring gear against rotation in a first rotary direction, and to release the third carrier and second ring gear in a rotary direction opposite the first direction.

DESCRIPTION OF THE PREFERRED EMBODIMENT

Figures 1, 2:
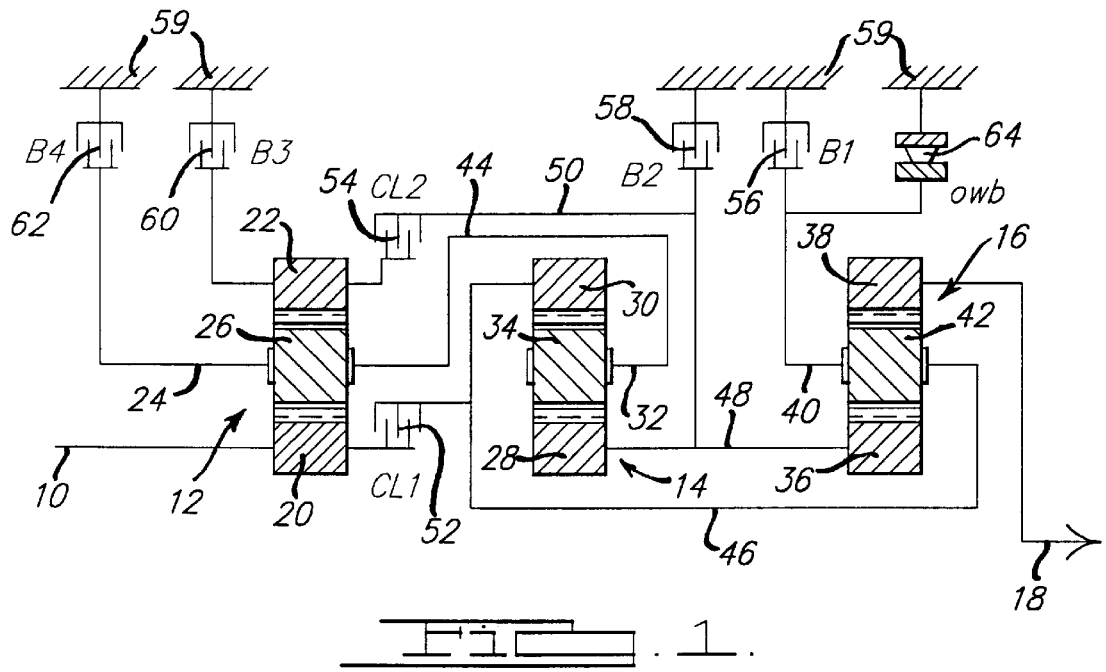
FIG. 1 is a schematic diagram of the kinematic arrangement of a transmission according to this invention.
FIG. 2 is a chart showing the engaged and disengaged state of the clutches and brakes corresponding to each speed ratio of the transmission of FIG. 1.

Referring to FIGS. 1 and 2, the kinematic arrangement of the epicyclic transmission according to this invention includes an input shaft 10, adapted to be driveably connected to a power sources such as an internal combustion engine or electric motor, first second and third simple planetary gearsets 12, 14, 16, output shaft 18, various members driveably connecting components of the gearsets, and clutches and brakes for controlling operation of the gearsets. Gearset 12 includes a sun gear 20, a ring gear 22 surrounding the sun gear, a carrier 24 and a first set of planet pinions 26 rotatably supported on carrier 24 and continually driveably engaged with the teeth of sun gear 20 and ring gear 22. Preferably the ratio of the diameters of ring gear 22 and sun gear 20 is about 2.20.

Gearset 14 includes a sun gear 28, ring gear 30 surrounding the sun gear, planet carrier 32, and a second set of planet pinions 34, rotatably supported on carrier 32 and in continuous meshing engagement with sun gear 28 and ring gear 30. Preferably the ratio of the diameter of ring gear 30 to that of sun gear 28 is about 2.30.

Gearset 16 includes sun gear 36, ring gear 38 surrounding the sun gear, a carrier 40, and a third set of planet pinions 42 rotatably, supported on the carrier and continually driveably engaged with sun gear 36 and ring gear 38. Preferably the ratio of the diameters of ring gear 38 and sun gear 36 is about 2.40.

Input shaft 10 is continually driveably connected to sun gear 20. Carrier 24 is continually driveably connected by a drum 44 to carrier 32. Ring gear 30 and carrier 40 are continually driveably connected by an intermediate shaft 46. Sun gears 28 and 36 are continually, mutually driveably connected by a member 48, which is continually driveably connected by a drum 50 to several friction control elements.

A hydraulically actuated friction clutch 52 alternately driveably connects and releases a connection between input shaft 10 and intermediate shaft 46, which connects ring gear 30 and carrier 40. A hydraulically actuated friction clutch 54 alternately driveably connects and releases a connection between ring gear 22 and sun gears 28, 36.

A hydraulically actuated friction brake 56 alternately holds carrier 40 and ring gear 30 against rotation on the transmission housing 59 and releases that connection. Friction brake 58 alternately holds sun gears 28, 36 and drum 50 against rotation on the transmission housing and releases those components to rotate. Friction brake 60 alternately holds ring gear 22 against rotation when the brake is engaged and releases that connection when the brake is disengaged. The friction brake 62 alternately holds carriers 24 and 32 against rotation when the brake is engaged and releases that connection when the brake is disengaged.

A mechanical overruning brake 64 provides a one-way drive connection between carrier 40 and ring gear 30 with the transmission housing to produce a one-way drive connection in one rotary direction and to release that connection in the opposite rotary direction.

Figures 3, 4:
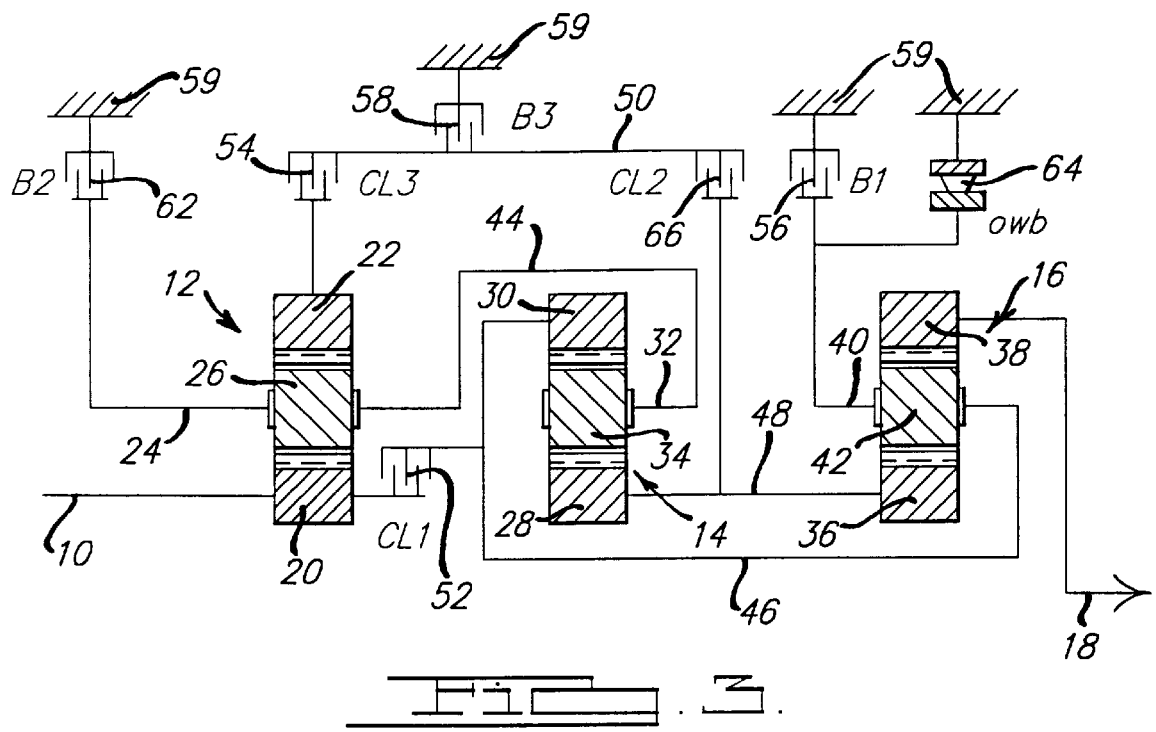
FIG. 3 is a schematic diagram of an alternate embodiment of a transmission according to this invention.
FIG. 4 is a chart showing the engaged and disengaged state of the clutches and brakes corresponding to each speed ratio of the transmission of FIG. 3.

Referring to FIGS. 3 and 4, the kinematic arrangement of FIG. 3 is substantially identical to that of FIG. 1, except for the addition of clutch 66, a hydraulically actuated friction clutch which alternately driveably connects sun gears 28, 26 and drum 50, or releases that connection when the clutch is disengaged. Brake 58 holds sun gears 28, 36 against rotation when engaged, provided clutch 66 is concurrently engaged. Similarly, brake 58 holds ring gear 22 fixed against rotation, provided clutch 54 is concurrently engaged. Brake 60 has been deleted from the embodiment of FIGS. 3 and 4.

In operation, the transmission of FIG. 1 produces a manually selected first forward speed ratio by engaging clutch 54 and brake 56. This action driveably connects ring gear 22 to sun gears 28 and 36, and holds carrier 40 and ring gear 30 fixed against rotation. With the transmission so disposed, ring gear 22 underdrives and reverses the direction of rotation of sun gear 28 relative to those of input shaft 10. The output of gearset 16, ring gear 38, is reversed and underdriven relative to the direction of rotation and speed of sun gear 36.

The first forward gear produced automatically in the drive range results by engaging clutch 54, which action causes brake 64 to produce a drive connection between the transmission housing 59, carrier 40 and ring gear 30, thereby holding those components. In addition brake 56 may be engaged to share the torque reaction provided otherwise solely by brake 64. The torque drive path through the transmission in first gear drive range is identical to that described above with reference to the first gear-manually selected range.

An upshift to the second forward speed ratio results by maintaining clutch 54 engaged and engaging brake 62. This action causes one-way brake 64 to overrun and holds carriers 24 and 32 fixed against rotation. Gearset 12 underdrives ring gear 22 and reverses its directional sense in relation to the speed and direction of input shaft 10. Carrier 32 provides a torque reaction for gearset 14, which again reverses the directional sense of rotation of ring gear 22 and underdrives ring gear 30 in relation to the speed of input shaft 10. Sun gear 36 of gearset 16 is driven at the speed and direction of ring gear 22 and carrier 40 is driven in the speed and direction of ring gear 30; therefore the output, taken at ring gear 38 and output shaft 18, is in the same direction as, and underdriven relative to the speed and direction of input shaft 10.

An upshift to the third forward speed ratio results by maintaining clutch 54 engaged, engaging brake 58, and disengaging brake 62, which action causes one-way brake 64 to overrun. Optionally brake 60 may also be engaged also in order to assist brake 58 in providing a torque reaction.

With the transmission so disposed, ring gear 22 is held fixed against rotation and sun gears 28 and 36 are fixed against rotation to provide a torque reaction for each of the gearsets. Carrier 24 of gearset 12 is underdriven compared to the speed of input shaft 10. Carrier 32 of gearset 14 is driven by carrier 24, sun gear 28 is held against rotation, and the output of gearset 14 is taken at ring gear 30, which is underdriven compared to the speed of input shaft 10. Sun gear 36 of gearset 16 is held against rotation, carrier 40 is driven directly from ring gear 30, and the output of the gearset, ring gear 38 and output shaft 18, are underdriven in the forward direction compared to the speed and direction of speed input shaft 10.

An upshift to the fourth forward speed ratio, a direct drive ratio, results by maintaining clutch 54 engaged, disengaging brake 58, and engaging clutch 52. This action has the effect of rotating each of the elements of each of the gearsets in the same direction as that of input shaft 10 so that the output is driven in the same direction and speed as input shaft 10.

An upshift to the first overdrive speed ratio, the fifth forward speed ratio, results by maintaining clutch 52 engaged, disengaging clutch 54, and engaging brake 58. As a result of this action, sun gear 36 of gearset 16 is fixed against rotation to provide the torque reaction, carrier 40 is driven through clutch 52 from input shaft 10, and the output, ring gear 38 and output shaft 18, is overdriven in the same direction as that of input shaft 10.

An upshift to the second overdrive speed ratio, the sixth forward speed ratio, results by maintaining clutch 52 engaged, disengaging brake 58, and engaging brake 60. A torque reaction is provided at ring gear 22, which is held fixed against rotation through brake 60, and the output of gearset 12, carrier 24, is underdriven compared to the speed of the input shaft 10. Ring gear 30 and carrier 40 are driven through clutch 52 from input shaft 10, and carrier 32 of gearset 14 is driven directly from carrier 24 of the first gearset. Therefore, the output of gearset 14, sun gear 28, drives sun gear 36, carrier 40 is driven at the speed of input shaft 10, and the output taken at ring gear 38 is overdriven relative to input shaft 10.

An upshift to the seventh forward speed ratio, a third overdrive ratio, is produced by maintaining clutch 52 engaged, disengaging brake 60, and engaging brake 62, which holds carrier 32 fixed against rotation. Clutch 52 driveably connects input shaft 10 to ring gear 30. The output of gearset 14, sun gear 28, overdrives sun gear 36 and reverses the directional sense relative to the speed and direction of input shaft 10. A second input to gearset 16, carrier 40, is driveably connected through clutch 52 to input shaft 10. The output shaft 18 is overdriven in the same directional sense as input shaft 10.

Reverse drive is produced by engaging brakes 56 and 60, and disengaging the other friction elements, which action causes one-way brake 64 to transfer no torque. With the transmission so disposed, carrier 40, ring gear 30 and ring gear 22 are held fixed against rotation. Gearset 12 underdrives its output, carrier 24, and the input to gearset 14, carrier 32, relative to the speed of input shaft 10. The torque reaction for gearset 14 is provided at ring gear 30, and the output, sun gear 28, overdrives ring gear 32 in a forward direction. The torque reaction at gearset 16 is provided at carrier 40. The output shaft 18, driven at the speed of ring gear 38, is underdriven in the reverse direction relative to input shaft 10.

In the embodiment of FIG. 3, drum 50 is driveably connected through clutch 54 to ring gear 22 and through clutch 66 to sun gears 28 and 36. In addition, drum 50 is adapted to be held fixed against rotation through operation of brake 58. This arrangement allows ring gear 22 to be held fixed against rotation through the engagement of brake 58 and clutch 54, rather than directly through the engagement of brake 60 as in the device of FIG. 1. The arrangement of FIG. 3 permits ring gear 22 and sun gears 28, 36 to be mutually driveably connected through the engagement of clutches 54 and 66 in the first, second and fourth forward speed ratios. The device of FIG. 3 operates to hold ring gear 22 fixed against rotation through the engagement of brake 58 and clutch 54 for operation in the sixth forward speed ratio and the reverse drive ratio, and to hold ring gear 22 and sun gears 28 and 36 fixed against rotation when clutches 54 and 66 are engaged and brake 58 is engaged in order to produce the gear arrangement required for the third forward speed ratio. When neither of the clutches 54, 66 are engaged, the device of FIG. 3 operates in the seventh speed ratio by allowing ring gear 22 and sun gears 28, 36 to rotate independently. To produce the fifth forward speed ratio, the device of FIG. 3 holds ring gear 36 fixed against rotation by engaging clutch 66 and brake 58.

Therefore, in the embodiments of FIGS. 1 and 3, all single and double shifts are single swap, i.e., the state of only one friction element is changed to produce the gear ratio change. Furthermore, all of the triple shifts are single swap, except the 2–5 upshift.

A five-speed, double overdrive variation of the embodiments of FIG. 1 results by omitting brake 62, thereby eliminating the second and seventh forward speed ratios. All of the other forward and reverse speeds of the transmission are produced and operate as described above with reference to FIGS. 1 and 2. In a preferred embodiment of the five-speed variation, the ratio of the number of teeth of the ring gear to that of the corresponding sun gear for each of the three gearsets is about 2.20.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple-speed transmission for a motor vehicle, comprising:
   an input;
   an output;
   a first gearset having a first sun gear driveably connected to the input, a first ring gear, a first carrier, a first planet pinion set rotatably supported on the first carrier and driveably engaged with the first sun gear and first ring gear;
   a second gearset having a second sun gear, a second ring gear, a second carrier driveably connected to the first carrier, a second planet pinion set rotatably supported on the second carrier and driveably engaged with the second sun gear and second ring gear;
   a third gearset having a third sun gear driveably connected to the second sun gear, a third ring gear driveably connected to the output, a third carrier driveably connected to the second ring gear, a third planet pinion set rotatably supported on the third carrier and driveably engaged with the third sun gear and third ring gear;
   a first clutch for alternately driveably connecting and disconnecting the first sun gear and the second ring gear;
   a second clutch for alternately driveably connecting and disconnecting the first ring gear and the second and third sun gears;
   a first brake for holding against rotation and releasing the third carrier and second ring gear;
   a second brake for holding against rotation and releasing the second and third sun gears; and
   a third brake for holding against rotation and releasing the first ring gear.

2. The multiple-speed transmission of claim 1, further comprising a fourth brake for holding against rotation and releasing the first and second carriers.

3. The multiple-speed transmission of claim 1, further comprising an overrunning brake for holding the third carrier and second ring gear against rotation in a first rotary direction, and for releasing the third carrier and second ring gear in a rotary direction opposite the first direction.

4. The multiple-speed transmission of claim 1, further comprising:
   a fourth brake for holding against rotation and releasing the first and second carriers; and
   an overrunning brake for holding the third carrier and second ring gear against rotation in a first rotary direction, and for releasing the third carrier and second ring gear in a rotary direction opposite the first direction.

5. A multiple-speed transmission for a motor vehicle, comprising
   an input;
   an output;
   a first gearset having a first sun gear driveably connected to the input, a first ring gear, a first carrier, a first planet pinion set rotatably supported on the first carrier and driveably engaged with the first sun gear and first ring gear;
   a second gearset having a second sun gear, a second ring gear, a second carrier driveably connected to the first carrier, a second planet pinion set rotatably supported on the second carrier and driveably engaged with the second sun gear and second ring gear;
   a third gearset having a third sun gear driveably connected to the second sun gear, a third ring gear driveably connected to the output, a third carrier driveably connected to the second ring gear, a third planet pinion set rotatably supported on the third carrier and driveably engaged with the third sun gear and third ring gear;
   a first clutch for alternately driveably connecting and disconnecting the first sun gear and second ring gear;
   a first brake for holding against rotation and releasing the third carrier and second ring gear; and
   a second brake for holding against rotation and releasing the first and second carriers;
   a third brake for holding against rotation and releasing the first ring gear, second sun gear and third sun gear;
   a second clutch for alternately driveably connecting and disconnecting the first ring gear and third brake; and
   a third clutch for alternately driveably connecting and disconnecting the second and third sun gears and the third brake.

6. The multiple-speed transmission of claim 5, further comprising an overrunning brake for holding the third carrier and second ring gear against rotation in a first rotary direction, and for releasing the third carrier and second ring gear in a rotary direction opposite the first direction.

7. A multiple-speed transmission for a motor vehicle, comprising:

an input;

an output;

a first gearset having a first sun gear driveably connected to the input, a first ring gear, a first carrier, a first planet pinion set rotatably supported on the first carrier and driveably engaged with the first sun gear and first ring gear;

a second gearset having a second sun gear, a second ring gear, a second carrier driveably connected to the first carrier, a second planet pinion set rotatably supported on the second carrier and driveably engaged with the second sun gear and second ring gear;

a third gearset having a third sun gear driveably connected to the second sun gear, a third ring gear driveably connected to the output, a third carrier driveably connected to the second ring gear, a third planet pinion set rotatably supported on the third carrier and driveably engaged with the third sun gear and third ring gear;

a first clutch for alternately driveably connecting and disconnecting the first sun gear and second ring gear;

means for alternately driveably connecting and disconnecting the first ring gear and the second and third sun gears, and for holding against rotation and releasing the first ring gear, second sun gear and third sun gear; and a first brake for holding against rotation and releasing the third carrier and second ring gear.

8. The multiple-speed transmission of claim 7, further comprising a second brake for holding against rotation and releasing the first and second carriers.

9. The multiple-speed transmission of claim 7, further comprising an overrunning brake for holding the third carrier and second ring gear against rotation in a first rotary direction, and for releasing the third carrier and second ring gear in a rotary direction opposite the first direction.

* * * * *